PHASE SENSITIVE TRANSISTOR DISCRIMINATOR AND HIGH GAIN TRANSISTOR AMPLIFIER

Filed June 6, 1960

INVENTOR.
BALTHASAR H. PINCKAERS
BY
Omund R. Dahle
ATTORNEY 3,121,805
PHASE SENSITIVE TRANSISTOR DISCRIMINATOR AND HIGH GAIN TRANSISTOR AMPLIFIER Balthasar H. Pinckaers, Edina, Minn., assignor to Minneapolis-Honeywell Regulator Company, Minneapolis, Minn., a corporation of Delaware Filed June 6, 1960, Ser. No. 34,190
11 Claims. (Cl. 307—88.5)

The invention is concerned with semiconductor control apparatus, and more particularly with improved condition responsive apparatus which includes transistor current controlling devices for controlling energization of load means for adjusting the condition.

An object of this invention is to provide an improved phase sensitive transistor discriminator-demodulator and high gain direct coupled transistor amplifier.

A further object of this invention is to provide an improved direct coupled composite transistor amplifier which can be controlled from full "on" to full "off" from a symmetrical discriminator, over widely varying operating temperatures.

A further object of this invention is to provide an improved phase sensitive discriminator which operates as a current source and is therefore relatively insensitive to the magnitude of load impedance connected thereto to control one or a plurality of slave amplifiers without any modification of the output circuit or impedance matching being required.

These and other objects of the invention will become apparent upon consideration of the accompanying claims, specification and drawing, of which:

Figures 1, 1A, 1B, 2, 2A, 2B, 3:
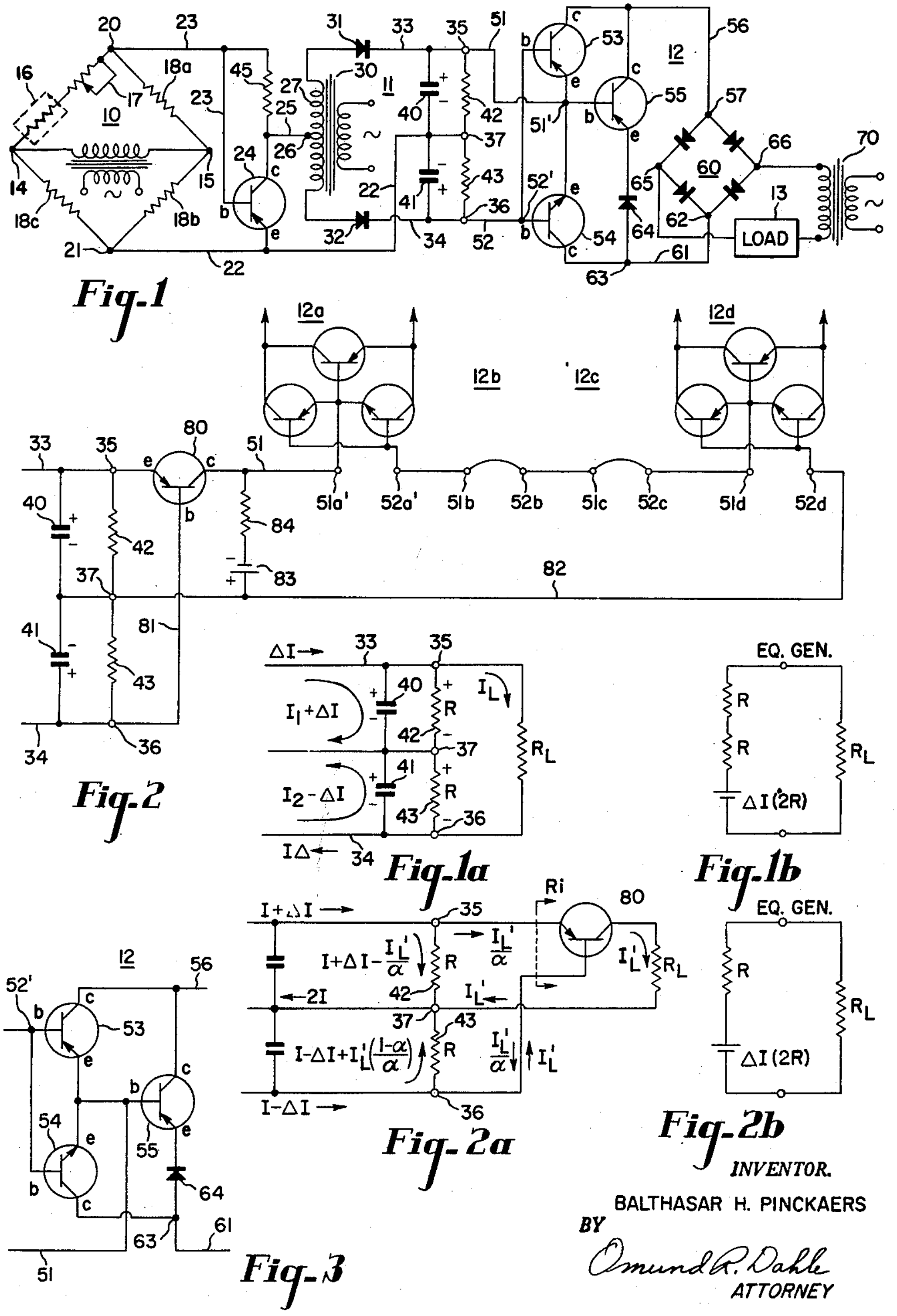
FIGURE 1 is a schematic representation of an embodiment of the invention.
FIGURE 2 is a modification of FIGURE 1 in which the discriminator output is connected as a current source to control one or a group of slave amplifiers.

FIGURES 1*a* and 1*b* are simplified schematics to aid in the explanation of the operation of FIGURE 1;

FIGURES 2*a* and 2*b* are simplified schematics to aid in the explanation of the operation of FIGURE 2; and, FIGURE 3 discloses a portion of the circuit of FIGURES 1 and 2.

Referring now to FIGURE 1, there is disclosed generally an A.C. signal bridge 10, a phase sensitive amplifier-discriminator or demodulator 11, and an improved D.C. slave amplifier 12 for controlling power to a load circuit 13. The signal bridge 10 may be energized from a source of alternating current at bridge input terminals 14 and 15. One leg of the bridge may include a condition responsive impedance element 16, which may be, for example, a temperature responsive resistive element, and a control point adjusting potentiometer 17. Conventional impedance elements may be included in the remaining legs of the bridge 18*a*, 18*b* and 18*c*. Output terminals 20 and 21 of the signal bridge are connected by conductors 23 and 22, respectively, to input terminals comprising a base electrode and an emitter electrode, of a transistor 24.

The transistor 24 and the associated circuitry, to be described below, make up the phase sensitive amplifier-demodulator 11. The transistor as disclosed is a PNP junction type transistor, but may be another type if desired and if proper energizing polarities are observed. The collector electrode 24*c* is connected by a conductor 25 to a center tap 26 of secondary winding 27 of a power transformer 30, the primary of which is excited by a suitable source of alternating current. The extremities of winding 27 are connected through diodes 31 and 32 and conductors 33 and 34, respectively, to output terminals 35 and 36 of the demodulator 11. The emitter electrode of transistor 24 is further connected by an extension of conductor 22 to a third output point 37, the purpose of which will become apparent in the discussion of FIGURE 2 to follow. A pair of capacitors 40 and 41 are connected from the conductors 33 and 34, respectively, to the conductor 22, a pair of resistors 42 and 43 being connected in parallel with the capacitors. A base bias resistor 45 for the transistor 24 is connected between the conductor 23 and conductor 25.

The direct current control amplifier or slave amplifier 12 has a pair of input conductors 51 and 52 connected to the discriminator output terminals 35 and 36. The conductor 52 directly connects to the base electrodes of transistors 53 and 54, transistor 53 being a PNP type and transistor 54 being an NPN type. The conductor 51 directly connects to the emitter electrodes of transistors 53 and 54 and to the base electrode of a PNP power transistor 55. The collector electrodes of transistors 53 and 55 are connected together and connected by a conductor 56 to one D.C. terminal 57 of a rectifier 60, here shown as a full-wave bridge type. The collector electrode of transistor 54 is connected by a conductor 61 to the other D.C. terminal 62 of the bridge rectifier. The bridge rectifier also includes a pair of A.C. input terminals 65 and 66 adapted to be energized from a source of A.C. which may be the same source energizing bridge 10 and transformer 30.

A junction 63 on the conductor 61 is connected through a voltage pedestal means 64, here shown as a silicon diode, to the emitter electrode of power transistor 55. The bridge input terminal 66 is connected to one terminal of a power transformer 70, which is energized by a source of alternating current. The other bridge input terminal 65 is connected through the load device 13 to the other terminal of transformer 70.

In considering the operation of the circuit of FIGURE 1, let it initially be assumed that the condition being sensed is such that bridge circuit 10 is balanced so that the bridge output signal is at a null. Under these conditions it is intended that a zero output signal should appear from the discriminator 11. The resistor 45, which is connected between the base and collector of the transistor 24, provides a base bias current path to establish a quiescent collector current for the transistor, thereby biasing transistor 24 into a Class A operating condition in the absence of signal. On the first half-cycle of the alternating supply to transformer 30, that is, with the upper extremity of winding 27 positive, a current path may be traced from the upper extremity of winding 27 through the rectifying diode 31, paralleled capacitor 40 and resistor 42, conductor 22, through transistor 24 from emitter to collector, and through conductor 25 to center tap 26. On the succeeding half-cycle a similar current path can be traced from the lower extremity of winding 27 through the rectifying diode 32, the paralleled capacitor 41 and resistor 43, the conductor 22, through transistor 24 and conductor 25 to the center tap 26. In the absence of signal, transistor 24 is equally conductive on both half-cycles and both capacitors 40 and 41 are charged to substantially large but equal potentials of opposite polarity. Thus, although there is a substantial negative potential between output terminal 37 and either 35 or 36, which may be in the order of 10 volts or more, the potential difference between terminal 35 and terminal 36 is zero.

When the signal bridge 10 becomes unbalanced, either due to a change in the condition being sensed or to an adjustment of the set point potentiometer 17, an alternating current signal of one phase or the other is applied to the base and emitter of transistor 24. The alternating current signal modulates the quiescent bias current of the transistor 24, increasing the current flow through the transistor on one half-cycle and decreasing it by an equal amount of the succeeding half-cycle, thereby causing an unbalance in the voltages appearing across capacitors 40 and 41. Thus a signal of one phase or the other from bridge 10 causes a D.C. unbalance of one polarity or the reverse, respectively, to appear at terminals 35 and 36.

When the bridge unbalance is such that demodulator output terminal 36 becomes negative with respect to terminal 35, it can be seen that a potential is applied between the base and emitter of transistor 53 which is in a direction to tend to render the transistor conductive. This current path can be traced from the terminal 35 through conductor 51, from emitter to base of transistor 53, and through conductor 52 to the terminal 36. The output circuit for transistor 53 is energized from power transformer 70 by way of full-wave rectifier 60 and transistor 55. A circuit may be traced from the rectifier bridge output terminal 62 through conductor 61, silicon diode 64, from emitter to base of transistor 55, then through transistor 53 from emitter to collector, and through conductor 56 to the return terminal 57 of the bridge rectifier. As a result, transistor 55 is also made conductive and a much larger current flows from the junction 62 through conductor 61, diode 64, through the output terminals of transistor 55 from emitter to collector, and through conductor 56 to the return terminal 57 of the full-wave rectifier 60. It will be apparent that the energization to the load 13 is proportional to the base current flowing in transistor 53 which controls the degree of conductivity of transistors 53 and 55.

When the bridge unbalance tends to reverse in polarity such that demodulator output terminal 35 becomes negative with respect to terminal 36, the potential applied to transtistor 53 is in a polarity direction to turn off the transistor 53 and also transistor 55, thereby decreasing to substantially zero the current flowing in the load 13.

One of the circuit design problems encountered in transistor application is caused by the variation of the transistor collector junction leakage current "$Ic_0$" as the operating temperature of the transistor changes. In transistor circuits designed to have substantially no output current in the absence of a signal, the minimum output current which can be realized is determined by the leakage current of the transistor. It is known in the art that by supplying the collector leakage current from the base electrode circuit, the collector current can be limited to the fundamental leakage current $Ic_0$. If this is not provided and the base circuit does not supply sufficient current, the collector leakage must be supplied from the emitter circuit and the collector current is no longer limited to $Ic_0$ but increases by the amplification of the transistor. In the use of composite type transistors a problem exists in providing the leakage current to the base of the second transistor. In the patent to Jensen 2,864,904, assigned to the same assignee as the present invention, an improved composite transistor is disclosed in which a diode is used to shunt the input circuit of the first transistor in order that a reverse signal potential could be applied to the base of the second transistor of the composite unit, thereby maintaining the leakage current of the composite unit at $Ic_0$. The present invention is an improvement on the Jensen patent in that the present invention utilizes a transistor in place of the diode of Jensen in order to provide a composite circuit in which the signal required from the signal source to hold-off the transistor is of the same order of magnitude as the turn-on signal so that a symmetrical discriminator may be used to control the amplifier.

As an example, and ignoring for the present paragraph the effect of transistor 54, consider a case in which it is desired that 600 milliamperes output current flows through the transistor 55 to energize the load 13. Assuming a current gain of 60 in transistor 55, a base current of 10 milliamperes is required. This 10 milliamperes must flow through the output circuit of transistor 53, and further assuming a current gain of 50 in transistor 53, it is apparent that a signal current change of 0.2 milliampere is required in the base circuit **53*b* from the signal source, here discriminator 11, in order to realize the 600 ma. output current. As has been mentioned above, in order to completely shut off power transistor 55, it is not sufficient to merely remove the forward bias to the transistor, but it is necessary to provide a sufficiently large reverse hold-off current to the base circuit to supply the collector junction leakage current $Ic_0$. At low temperatures the current required is not severe; however, as ambient operating temperatures increase toward a high value, to which the control equipment is often subjected, the collector junction leakage current $Ic_0$ increases nonlinearly to a value in the order of 15 milliamperes. This current needs to be supplied into the base circuit to maintain the transistor 55 cutoff. Thus it can be appreciated that under high operating temperatures the current required to hold-off the power transistor may become several orders of magnitude larger than the current required to turn on the transistor at lower temperatures and the problems in designing a suitable signal current supply become very troublesome. Thus the composite circuit of the type disclosed in the Jensen patent above referenced has certain limitations where it is desired to control the amplifier from a symmetrical demodulator such as demodulator 11**, especially when operating temperatures vary widely.

Considering now the improved composite circuit, shown apart in FIGURE 3, it can be seen that the base-emitter junction of NPN transistor 54 parallels and shunts the input electrodes of transistor 53 in the same manner as a diode. The emitter **54*e* and collector 54*c*, however, are connected to shunt the input electrodes of power transistor 55, and although the same 15 ma. is required to hold power transistor 55 off under high temperature conditions, the 15 ma. leakage current can be supplied through the collector-emitter circuit of transistor 54 from source 70. The diode 64 provides a voltage pedestal in the emitter circuit of the power transistor to ensure that little or no current flows in that emitter when transistor 54 is conductive. Assuming a current gain of 50 in NPN transistor 54, a signal current of 0.3 ma. in base 54*b* is required from the signal source to provide 15 ma. in the collector circuit. The turn-on and the hold-off currents required for the composite unit from the signal source are now of the same order of magnitude and a symmetrical type signal generator such as discriminator 11** can be used to control the amplifier.

FIGURE 2

In many control systems, it may be desirable to build the sensing bridge 10 and the phase sensitive demodulator 11 as one unit which is adapted to control equally well either one or many slave amplifiers 12 at remote positions, as the situation may require. For this type of application, the demodulator operation must be relatively unaffected by changes in magnitude of the load impedance into which the demodulator must operate, that is, it must be designed to accommodate the impedance presented by either a single slave amplifier or by a plurality of amplifiers without loss or change of sensitivity in the system. The modified discriminator portion of the circuit as shown in FIGURE 2 includes an additional transistor 80 which has its emitter directly connected to the terminal 35 and its base electrode directly connected by a conductor 81 to the terminal 36. The collector electrode of the transistor 80 is connected by a conductor 51 to the input terminal **51*a* of the slave amplifier 12*a*. A conductor 82 is connected from the junction 37 to the input terminal 52*d* of slave amplifier 12*d*. The input electrodes of the slave amplifiers are connected in series between the collector 80*c* and the junction 37 and this path may be traced from collector 80*c* through conductor 51, terminals 51*a*', 52*a*', 51*b*, 52*b*, 51*c*, 52*c*, 51*d*, 52*d* and back through conductor 82 to the terminal 37. In FIGURE 2, the slave amplifiers 12*b* and 12*c*** have been omitted and in this case the unused terminals are merely shorted across. A bias source 83 and a series resistor 84 are connected between the conductors 51 and 82.

Before discussing the improved discriminator operation, further consideration will be given to the discriminator of FIGURE 1, to aid in the later discussion of the discriminator of FIGURE 2. Referring to FIGURE 1*a*, the currents $I_1$ and $I_2$ shown flowing through resistors 42 and 43 and charging capacitors 40 and 41, respectively, represent the quiescent current flowing through transistor 24 in the absence of signal, as previously described. These equal currents $I_1$ and $I_2$ establish the initial conditions of substantially large voltages on capacitors 40 and 41, the voltages being equal in magnitude and opposite in polarity so that no potential difference exists between terminal 35 and terminal 36. In other words, capacitor 40 has an absolute polarity such that terminal 35 is positive with respect to terminal 37 and capacitor 41 has an absolute polarity such that terminal 36 is positive with respect to terminal 37. The current $I_L$ shown in FIGURE 1*a* flowing to the discriminator load $R_L$ (amplifier 12 of FIGURE 1) is therefore zero under no signal conditions. In the discussion to follow, the absolute polarities on capacitors 40 and 41 will be given no further consideration; only the changes in the currents and the changes in capacitor voltages will be under consideration. Thus, it will be noted that while the actual D.C. polarities on capacitors 40 and 41 are shown in FIGURE 1, this is not so in FIGURE 1*a* where the effective dynamic signals are shown.

Referring again to FIGURE 1*a*, assume a signal causes an increase in the current $I_1$ by an amount $\Delta I$ and causes a decrease in the current $I_2$ by an equal amount $\Delta I$. With respect to the quiescent condition the signal causes an additional potential to appear on capacitor 40 which is positive at terminal 35 and also causes an additional potential to appear on capacitor 41 which is positive at terminal 37 with respect to 36. This is to say, the absolute voltage on capacitor 41 has decreased a slight amount. These signal potentials on capacitors 40 and 41 cause a current $I_L$ to flow from terminal 35 through the load $R_L$ to terminal 36. Considering the discriminator as a generator, it is possible to apply Thevenin's theorem and consider the equivalent circuit. Looking from the load $R_L$ back into terminals 35 and 36, the transistor 24 operates as a current generator and presents substantially an infinite impedance and therefore the equivalent generator resistance is equal to resistance $R_{42}$+resistance $R_{43}$ or 2R. Then reapplying the source, which is in effect a constant current $\Delta I$, and removing the load to provide an open circuit, the open circuit voltage is $$(I+\Delta I)R_{42}-(I-\Delta I)R_{43}$$

Since $I_1=I_2$ and $R_{42}=R_{43}=R$ this simplifies to $$(\Delta I)R_{42}+(\Delta I)R_{43}=\Delta I(2R)$$

The equivalent generator is shown in FIGURE 1*b* and has an open circuit voltage $\Delta I(2R)$ and an internal resistance of 2R. The load current $I_L$ can now be determined by Ohm's law $$I_L=\frac{\Delta I(2R)}{2R+R_L}=\Delta I\frac{2R}{2R+R_L}$$

If $2R>>R_L$ (as is preferred in this invention) then $I_L$ is approximately equal to $\Delta I$.

Turning now to the improved discriminator-demodulator of FIGURE 2, there are several distinct advantages to be gained by its use. One advantage is that the gain or output of the discriminator is doubled and another is that the range over which the discriminator output is linearly proportional to the signal input is greatly extended. In other words, the discriminator of FIGURE 2 is improved as a current generator. FIGURE 2*a* represents FIGURE 2 in much the same manner FIGURE 1*a* represented FIGURE 1. The transistor 80 is connected in a common base configuration which has a low input impedance. In this configuration there is no current gain in the transistor itself as the collector or output current is approximately equal to the emitter current multiplied by $\alpha$, which is less than unity. A typical value of $\alpha$ may be .98 so that by assuming $\alpha\cong1$ the current to the load $R_L$ is substantially equal to $I_L'$. In comparing FIGURE 2 with FIGURE 1 the values of $\Delta I$, $R_{42}$, and $R_{43}$, and $R_L$ remain identical; however, it will be shown that $I_L'$ is approximately equal to $2I_L$.

In FIGURE 2*a*, the current flowing in the load $R_L$ is given a value $I_L'$. $I_L'$ is the collector current of transistor 80 and therefore the emitter current is $I_L'/\alpha$. The net current flowing in the base circuit must therefore be the emitter current $I_L'/\alpha$ less the collector current $I_L'$ or $$I_L'\left(\frac{1-\alpha}{\alpha}\right)$$

Letting the input resistance of transistor 80 between emitter and base be represented by $R_i$ it is possible to equate the voltage across the transistor with the voltage across terminals 35 and 36 in the following manner:

$$\frac{I_L'}{\alpha}R_i=(I+\Delta I)R_{42}-I_L'/\alpha R_{42}-R_{43}(I-\Delta I+I_L'/\alpha-I_L')$$

letting $R_{42}=R_{43}=R$ and simplifying $$\frac{I_L'}{\alpha}R_i=2\Delta IR-2I_L'/\alpha R+I_L'R$$

$$I_L'\left(\frac{R_i}{\alpha}+\frac{2R}{\alpha}-R\right)=2\Delta IR$$

$$I_L'=\Delta I\frac{2R}{\frac{R_i}{\alpha}+\frac{2R}{\alpha}-R}$$

Assuming $\alpha\cong1$ the equation becomes $$I_L'\cong\Delta I\frac{2R}{R_i+R}$$

Since the input impedance of a common base transistor is relatively low, for the condition $R>>R_i$ $$I_L'=2\Delta I$$

Thus $$I_L'=2I_L$$

Thus it may be seen that the effective equivalent generator for the circuit of FIGURE 2 as compared with FIGURE 1 must have an internal resistance of approximately R rather than 2R as in FIGURE 1.

In addition to approximately doubling the current to the load, the circuit of FIGURE 2 has available the entire D.C. voltage across capacitor 41 and resistor 43 (which may be in the order of 10 volts) to maintain constant the current $I_L'$ to the load $R_L$. This is in contrast to the signal $\Delta I2R$ (in the order of millivolts) in the circuit of FIGURE 1. For this reason the demodulator of FIGURE 2 is relatively insensitive to the magnitude of the load resistance and is well adapted to be connected to control one or a plurality of slave amplifiers.

The drawing has illustrated a single sided output, that is, the slave amplifier 12 is energized for one direction of unbalance of bridge 10 to energize load 13. If it is desired that the opposite direction of unbalance of bridge 10 energize another load device in a similar manner, in FIGURE 2 for example, the apparatus to the right of terminals 35, 36 and 37 can be duplicated by a mirror image circuit and connected with the mirror image transistor 80' having its emitter connected to terminal 36 and its base to terminal 35.

I claim as my invention:

1. Composite semiconductor signal translating means comprising: a plurality of semiconductor current controlling devices consisting of not more than three of said current controlling devices and including first, second and third semiconductor current controlling devices each having input, output and control electrodes, said first and second devices being of one conductivity type and said third device being of the opposite conductivity type; output means directly connecting together the output electrodes of said first and second devices, said output means also being connected to the input electrode of said second device; means directly connecting the input electrodes of said first and third devices to the control electrode of said second device; means connecting the output electrode of said third device to the input electrode of said second device; and means connecting a source of control signal to the control electrodes of said first and third devices.

2. Composite semiconductor signal translating means comprising: a plurality of transistors consisting of not more than three transistors and including first, second and third transistors each having emitter, collector and base electrodes, said first and second transistors being of one conductivity type and said third transistor being of the opposite conductivity type; output means directly connecting together the collector electrodes of said first and second transistors, said output means also being connected to the emitter of said second transistor and to the collector of said third transistor; means directly connecting the emitter of said first and third transistors to the base electrode of said second transistor; and means connecting a source of control signal to the base electrodes of said first and third transistors.

3. Semiconductor current control means comprising: first and second semiconductor current control devices of one conductivity type, a third semiconductor current control device of the opposite conductivity type, each having a plurality of electrodes including an input, an output and a control electrode; first means directly connecting the input electrodes of said first and third devices to the control electrode of said second device; second means directly connecting together the output electrodes of said first and second devices; a source of control signal connected between said first means and the control electrodes of said first and third devices; and further means connecting the output electrode of said third device to the input electrode of said second device, said second and further means being connected to an output circuit.

4. Semiconductor current control means comprising: first and second transistor devices of one conductivity type, a third transistor device of the opposite conductivity type, each having a plurality of electrodes including an emitter, a collector and a base; first means directly connecting the emitters of said first and third devices to the base of said second device; second means directly connecting together the collectors of said first and second devices; a source of control signal connected between said first means and the base electrodes of said first and third devices; and further means connecting the collector of said third device to the emitter of said second device, said second and further means being connected to an output circuit.

5. Semiconductor current control means comprising: p and n conductivity type semiconductor devices including first and second devices of one of said conductivity type, a third device of the opposite conductivity type, each having a plurality of electrodes including an input, an output and a control electrode; first means directly connecting the input electrodes of said first and third devices to the control electrode of said second device; second means directly connecting together the output electrodes of said first and second devices; a source of control signal connected between said first means and the control electrodes of said first and third devices; and further means connecting the output electrode of said third device to the input of said second device, said second and further means being connected to an output circuit.

6. Composite semiconductor signal translating means comprising: first, second and third transistors each having emitter, collector and base electrodes, said first and second transistors being of one conductivity type and said third transistor being of the opposite conductivity type; means directly connecting the emitter and collector electrodes of said first transistor to the base and collector of said second transistor; means directly connecting the emitter and collector electrode of said third transistor to the base and emitter electrode of said second transistor; output means connected to said second transistor; and means connecting one terminal of a source of control signal to the base electrodes of said first and third transistors and the other terminal to the base of said second transistor.

7. Improvements in class A transistor phase discriminator of the type having a differential output in which a normally conductive transistor amplifier is connected in circuit with two impedance networks and a source of pulsating direct current voltage, which voltage is obtained by full-wave rectification of an alternating current voltage, the normal transistor current being modified by a condition responsive alternating current signal, the transistor current from the source being delivered through one impedance network during one half-cycle of the rectified alternating current voltage and through the other impedance network during the other half-cycle to produce relatively large, equal and opposing voltages across said two impedance networks with an output terminal connected to each of said impedance networks, the improvement comprising: a second transistor having a plurality of electrodes including emitter, collector and control electrodes, said emitter being connected to one of said output terminals, said base being connected to the other of said output terminals and the load apparatus being connected between said collector electrode and the common junction of said two impedance networks.

8. Improvements in class A transistor phase discriminator of the type having a differential output in which a normally conductive transistor amplifier is connected in circuit with two impedance networks and a source of pulsating direct current voltage, which voltage is obtained by full-wave rectification of an alternating current voltage, the normal transistor current being modified by a condition responsive alternating current signal connected to the input of said transistor, the transistor current from the source being delivered through one impedance network during one half-cycle of the rectified alternating current voltage and through the other impedance network during the other half-cycle to produce relatively large, equal and opposing voltages across said two impedance networks with an output terminal connected to each of said impedance networks, the application of signal causing an unbalance in said two opposing voltages to produce a differential direct current output at said terminals to control load apparatus connected thereto, the improvement comprising: impedance coupling apparatus comprising a second transistor having a plurality of electrodes including emitter, collector and control electrodes, said emitter being connected to one of said output terminals, said base being connected to the other of said output terminals and the load apparatus being connected between said collector electrode and the common junction of said two impedance networks whereby the differential current controls said second transistor and the relatively large voltage across one of said impedance networks is effective to energize said load apparatus.

9. Control apparatus adaptable for energizing one or a number of remote slave amplifiers in response to a condition comprising: a phase discriminator circuit including a first normally conductive transistor amplifier which is connected in circuit with two identical impedance networks and a source of pulsating direct current voltage, which voltage is obtained by full-wave rectification of an alternating current voltage, the normal transistor current being modified by a condition responsive alternating current signal connected to the input of said transistor, the transistor current from the source being delivered through one impedance network during one half-cycle of the rectified alternating current voltage and through the other impedance network during the other half-cycle to produce relatively large, equal and opposing voltages across said two impedance networks with an output terminal connected to each of said impedance networks, the application of signal causing an unbalance in said two opposing voltages to produce a differential direct current output at said terminals; a second transistor having a plurality of electrodes including emitter, collector and control electrodes, said emitter being connected to one of said output terminals, said base being connected to the other of said output terminals and the control circuit of said remote slave amplifiers being connected between said collector electrode and the common junction of said two impedance networks whereby the differential current controls said second transistor and the relatively large voltage across one of said impedance networks applied through said second transistor is effective to control said slave amplifiers.

10. Control apparatus adaptable for energizing one or a number of remote slave amplifiers in response to a condition comprising: a phase discriminator circuit including a first normally conductive transistor amplifier which is connected in circuit with two identical impedance networks and a source of pulsating direct current voltage, which voltage is obtained by full-wave rectification of an alternating current voltage, the normal transistor current being modified by a condition responsive alternating current signal connected to the input of said transistor, the transistor current from the source being delivered through one impedance network during one half-cycle of the rectified alternating current voltage and through the other impedance network during the other half-cycle to produce relatively large, equal and opposing voltages across said two impedance networks with an output terminal connected to each of said impedance networks whereby in the absence of signal no output voltage appears between said two output terminals, the application of signal causing an unbalance in said two opposing voltages to produce a differential direct current output at said terminals of one polarity or the other dependent on the relative phase of the alternating signal; a second transistor having a plurality of electrodes including emitter, collector and control electrodes, said emitter being connected to one of said output terminals, said base being connected to the other of said output terminals and the control circuit of said remote slave amplifiers being connected between said collector electrode and the common junction of said two impedance networks whereby the differential current controls the conductivity of said second transistor and the relatively large direct current voltage across one of said impedance networks is applied through said second transistor in accordance with the conductivity thereof and is effective to control said slave amplifiers.

11. Control apparatus adaptable for energizing one or a number of remote slave amplifiers in response to a condition, said remote amplifiers being of the composite transistor-amplifier type in which first, second and third transistors each have emitter, base and collector electrodes, the first and second of said transistors being of one conductivity type, said third transistor being of the opposite conductivity type, output means directly connecting together the collector electrodes of said first and second transistors, said output means also being connected to the emitter of said second transistor, means connecting the emitter of said first and third transistor to the base of said second transistor; said control apparatus comprising a phase discriminator circuit including a fourth normally conductive transistor amplifier which is connected in circuit with two identical impedance networks and a source of pulsating direct current voltage, which voltage is obtained by full-wave rectification of an alternating current voltage, the normal transistor current being modified by a condition responsive alternating current signal connected to the input of said transistor, the transistor current from the source being delivered through one impedance network during one half-cycle of the rectified alternating current voltage and through the other impedance network during the other half-cycle to produce relatively large, equal and opposing voltages across said two impedance networks with an output terminal connected to each of said impedance networks, the application of signal causing an unbalance in said two opposing voltages to produce a differential direct current output at said terminals; a fifth transistor having a plurality of electrodes including emitter, collector and control electrodes, said emitter being connected to one of said output terminals, said base being connected to the other of said output terminals and the control circuit of said remote slave amplifiers being connected between said collector electrode and the common junction of said two impedance networks whereby the differential current controls said second transistor and the relatively large voltage across one of said impedance networks is applied through said fifth transistor to the base electrodes of said first and third transistors to control said slave amplifiers.

References Cited in the file of this patent

UNITED STATES PATENTS

| | | |
|---|---|---|
| 2,859,402 | Schaeve | Nov. 4, 1958 |
| 2,913,657 | Erickson | Nov. 17, 1959 |
| 2,931,971 | May | Apr. 5, 1960 |
| 3,049,630 | Sapino | Aug. 14, 1962 |